March 18, 1941.  J. P. JYRKAS  2,235,371
FISH LANDING DEVICE
Filed June 12, 1940   2 Sheets-Sheet 1

Inventor
John P. Jyrkas
By Clarence A. O'Brien
Attorney

March 18, 1941. J. P. JYRKAS 2,235,371
FISH LANDING DEVICE
Filed June 12, 1940 2 Sheets-Sheet 2
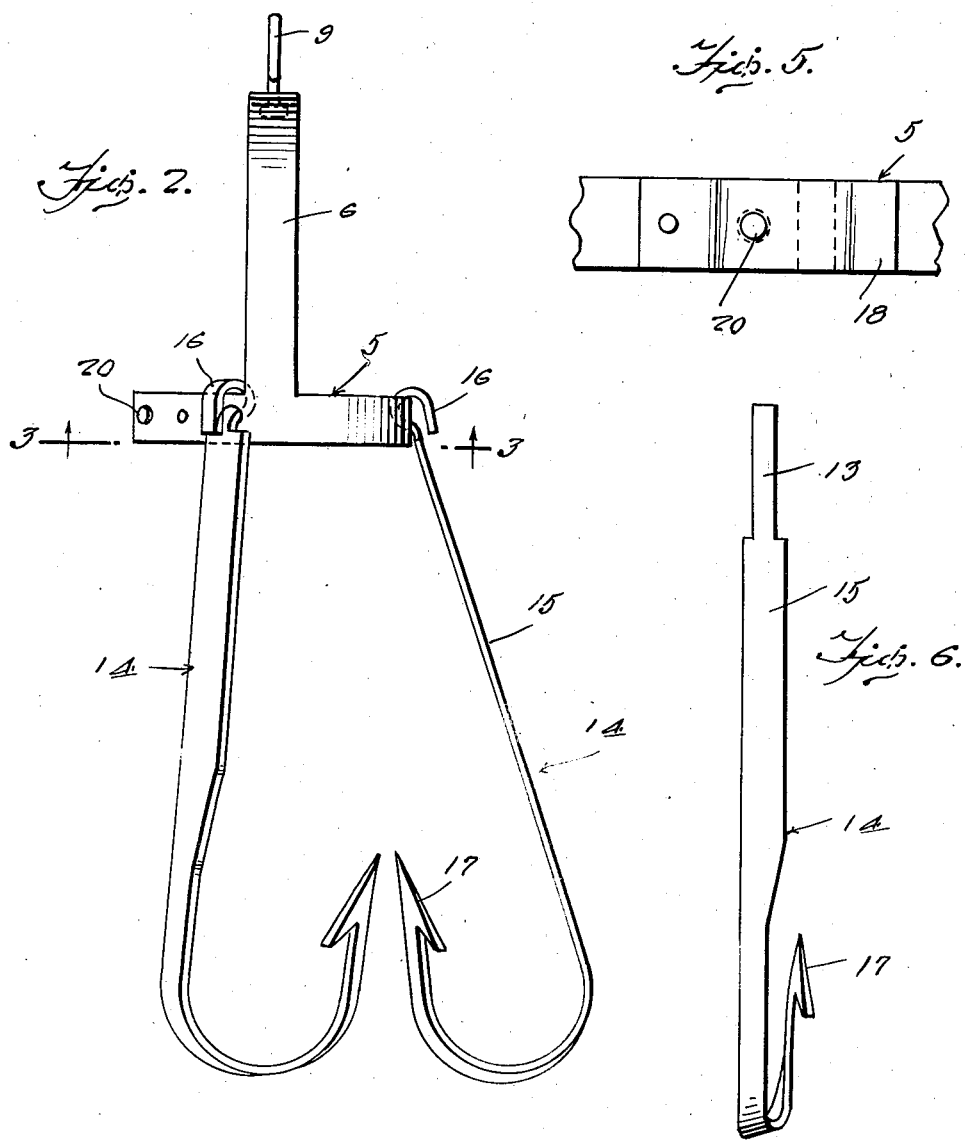
Inventor
John P. Jyrkas
By Clarence A. O'Brien
Attorney Patented Mar. 18, 1941

2,235,371

UNITED STATES PATENT OFFICE 2,235,371

FISH LANDING DEVICE

John P. Jyrkas, Fergus Falls, Minn.

Application June 12, 1940, Serial No. 340,172

3 Claims. (Cl. 43—5)

This invention relates to a fish landing device, and has for the primary object the provision of a device of the above stated character which may be easily and quickly applied to a fishing line and lowered into engagement with a fish caught on the hook of the line and which will efficiently bite into the fish to assure against the fish getting away or off of the hook and which may be employed along with the fishing line in landing the fish.

With these and other objects in view as will become more apparent as the description proceeds, the invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a fish landing device and showing the same associated with a fishing line and engaging a fish caught on the hook of the line.

Figure 2 is an enlarged side elevation illustrating the landing device.

Figure 5 is a detail view illustrating a spring closure element.

Figure 6 is a side elevation illustrating one of the hooks of the landing device.

Figure 1:
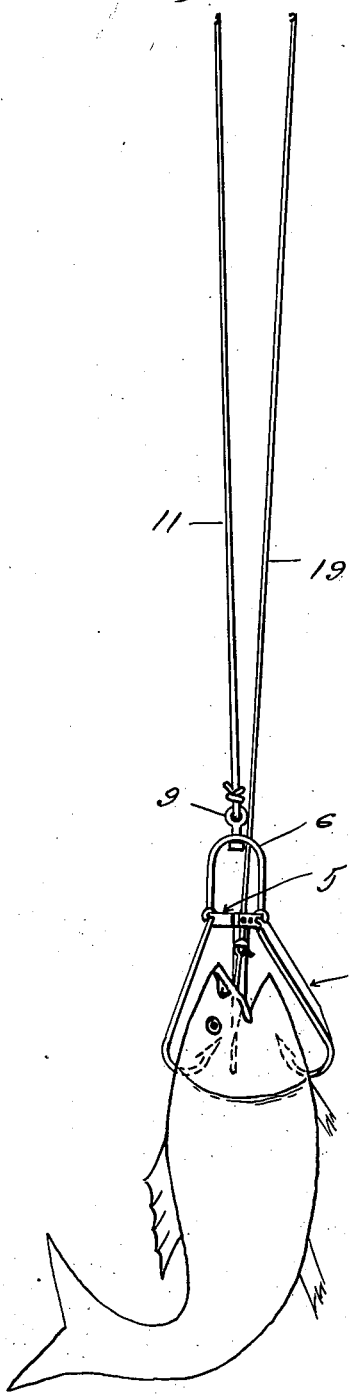
Figure 3:
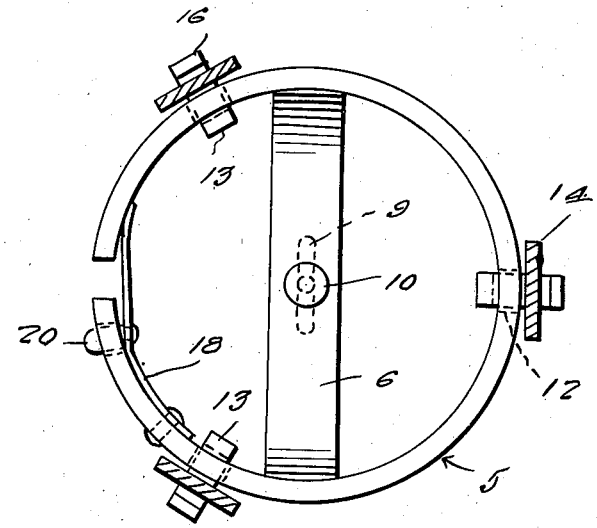
Figure 3 is a sectional view taken on the line 3—3 of Figure 2.
Figure 4:
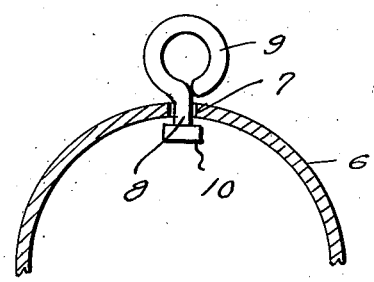
Figure 4 is a fragmentary vertical sectional view illustrating a bail forming a part of the landing device and having journaled thereto a line attaching eye.

Referring in detail to the drawings, the numeral 5 indicates a split band or ring on which is formed a substantially semi-circular shaped bail 6 provided with an opening 7 through which a shank 8 of an eye fastener 9 extends. The shank 8 is headed, as shown at 10, after passing through the opening in the bail 6. The eye fastener is employed for connecting a stout or strong line 11 to the device.

The band or ring 5 at spaced intervals is provided with slots 12 to receive attaching portions 13 of hooks 14. The hooks 14 are of comparatively large size and the shanks 15 thereof are reduced to form the attaching portions 13. The attaching portions 13 are passed through the slots and bent into substantially loop formation, as shown at 16, for hingedly securing the hooks on the band. The barbs 17 of the hooks when the latter are connected to the band or ring as specified, oppose each other and will swing into close relation to one another by gravitation.

A resilient latch member 18 is secured on the band or ring adjacent one of its ends and spans the space between the ends of the band or ring. The flexible or resilient latch member will readily flex to permit the passing of a fishing line 19 into the ring or band so that the landing device may be lowered along the fishing line 19 by the line 11 and as the hooks 14 engage with the fish caught on the line the hooks spread apart so that when a pull is made on the line 11 the hooks will bite into the fish approximately rearwardly of the head of the fish so as to assure against the fish getting off of the hook of the line 19. With the device applied to the fish as shown in Figure 1, the fish may be landed through the use of the lines 19 and 11 with absolute safety against escape.

The latch member 18 is provided with a finger button 20 which extends through an opening in the band 5 so that said member 18 may be flexed to open the band.

While I have shown and described the preferred embodiment of my invention, it will be understood that minor changes in construction, combination and arrangement of parts may be made without departing from the spirit and scope of the invention as claimed.

Having thus described the invention, what I claim is:

1. A fish landing device comprising a split band, a substantially semi-circular shaped bail integrally connected with the band, said split band adapted to be placed on a fishing line by passing the line between the ends of said band, a resilient securing means secured to the band and spanning the space between the ends of the band and capable of flexing to permit the fishing line to enter the band, and hooks hinged to the split band.

2. A fish landing device comprising a split band, a substantially semi-circular shaped bail integrally connected with the band, said split band adapted to be placed on a fishing line by passing the line between the ends of said band, a resilient securing means secured to the band and spanning the space between the ends of the band and capable of flexing to permit the fishing line to enter the band, said band having spaced slots, and fishing hooks including shanks having reduced end portions insertible through the slots and bent over edges of the band in loop formation to hinge the hooks on the band.

3. A fish landing device comprising a split band to permit the application thereof to a fishing line, means for connecting a line to the split band, fish hooks hinged on the band with the barbs thereof in opposed relation so that the hooks will readily spread apart on engagement with a fish and bite into the fish upon a pull being made on the latter-named line, and a spring member secured to the band and acting to prevent the former-named line from accidentally moving between ends of the band.

JOHN P. JYRKAS.